United States Patent [19]
Helland et al.

[11] Patent Number: 6,014,666
[45] Date of Patent: Jan. 11, 2000

[54] DECLARATIVE AND PROGRAMMATIC ACCESS CONTROL OF COMPONENT-BASED SERVER APPLICATIONS USING ROLES

[75] Inventors: Patrick James Helland, Redmond; Rodney Limprecht, Woodinville; Mohsen Al-Ghosein, Issaquah; David R. Reed, Seattle; William D. Devlin, Redmond, all of Wash.

[73] Assignee: Microsoft Corporation, Redmond, Wash.

[21] Appl. No.: 08/958,974

[22] Filed: Oct. 28, 1997

[51] Int. Cl.⁷ .................................................. G06F 17/30
[52] U.S. Cl. .............................. 707/9; 707/10; 395/701; 395/702; 395/703; 395/704; 395/707; 395/710
[58] Field of Search .................................. 707/103, 9, 10; 395/701, 703, 704, 702, 707, 710

[56] References Cited

U.S. PATENT DOCUMENTS

| | | | |
|---|---|---|---|
| 5,455,953 | 10/1995 | Russell | 710/266 |
| 5,481,715 | 1/1996 | Hamilton et al. | 395/700 |
| 5,524,238 | 6/1996 | Miller et al. | 707/4 |
| 5,577,252 | 11/1996 | Nelson et al. | 395/670 |
| 5,689,708 | 11/1997 | Regnier et al. | 395/682 |
| 5,717,439 | 2/1998 | Levine et al. | 345/353 |
| 5,778,365 | 7/1998 | Nishiyama | 707/9 |
| 5,815,665 | 9/1998 | Teper et al. | 709/229 |
| 5,822,435 | 10/1998 | Boebert et al. | 380/49 |
| 5,832,274 | 11/1998 | Cutler et al. | 395/712 |
| 5,838,916 | 11/1998 | Domenikos et al. | 395/200.49 |
| 5,864,683 | 1/1999 | Boebert et al. | 709/249 |
| 5,881,225 | 3/1999 | Worth | 713/200 |
| 5,941,947 | 8/1999 | Brown et al. | 709/225 |

OTHER PUBLICATIONS

Barkley, "Role Based Access Control (RBAC)," Software Diagnostics and Conformance Testing National Institute of Standards and Technology (Mar. 1998).

Gavrila and Barkley, "Formal Specification for Role Based Access Control User/Role and Role/Role Relationship Management," (Oct. 1998).

Barkley, "Application Engineering in Health Care," pp. 1–7 (May 9, 1995).

Cugini and Ferraiolo, "Role Based Access Control Slide Set—May 1995," National Institute of Standards and Technology (1995).

Smith, Sr. et al., "A Marketing Survey of Civil Federal Government Organizations to Determine the Need for a Role–Based Access Control (RBAC) Security Product," Seta Corporation (Jul. 1996).

Ferraiolo and Barkley, "Specifying and Managing Role–Based Access Control within a Corporation Intranet," (1997).

Ferraiolo et al., "Role–Based Access Control (RBAC): Features and Motivations," (1995).

Kuhn, "Mutual Exclusion of Roles as a Means of Implementing Separation of Duty in Role–Based Access Control Systems," (1997).

(List continued on next page.)

*Primary Examiner*—Anton W. Fetting
*Assistant Examiner*—Jean M. Corrielus
*Attorney, Agent, or Firm*—Klarquist Sparkman Campbell Leigh & Whinston LLP

[57] ABSTRACT

A programming model for component-based server applications provides declarative and programmatic access control at development without knowledge of the security configuration at deployment. The developer defines the server application access control by defining logical classes of users, called roles. The developer also can declare access privileges of the roles at package, component and interface levels of the server application. At development, the roles are bound to the particular security configuration of the server computer. The programming model also provides application programming and integration interfaces with which the developer can programmatically define access control of the roles to the server application's processing services.

12 Claims, 19 Drawing Sheets

OTHER PUBLICATIONS

Barkley, "Comparing Simple Role Based Access Control Models and Access Control Lists," (1997).

Barkley et al., "Role Based Access Control for the World Wide Web," (1997).

Ferraiolo and Kuhn, "Role–Based Access Control," Reprinted from Proceedings of 15$^{th}$ National Computer Security Conference (1992).

Barkley, "Implementing Role Based Access Control using Object Technology,"(1995).

Tucker (editor), *"The Computer Science and Engineering Handbook"*, chapter 49, pp. 1112–1124 and chapter 91, pp. 1929–1948 (1996).

DECLARATIVE AND PROGRAMMATIC ACCESS CONTROL OF COMPONENT-BASED SERVER APPLICATIONS USING ROLES

FIELD OF THE INVENTION

The present invention relates to a server application-programming model using software components, and more particularly relates to maintaining security of a component-based server application.

BACKGROUND OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

In a server application that is used by a large number of people, it is often useful to discriminate between what different users and groups of users are able to do with the server application. For example, in an on-line bookstore server application that provides processing services for entering book orders, order cancellations, and book returns, it may serve a useful business purpose to allow any user (e.g., sales clerk or customers) to access book order entry processing services, but only some users to access order cancellation processing services (e.g., a bookstore manager) or book return processing services (e.g., returns department staff).

Network operating systems on which server applications are typically run provide sophisticated security features, such as for controlling which users can logon to use a computer system, or have permission to access particular resources of the computer system (e.g., files, system services, devices, etc.) In the Microsoft Window NT operating system, for example, each user is assigned a user id which has an associated password. A system administrator also can assign sets of users to user groups, and designate which users and user groups are permitted access to system objects that represent computer resources, such as files, folders, and devices. During a logon procedure, the user is required to enter the user id along with its associated password to gain access to the computer system. When the user launches a program, the Windows NT operating system associates the user id with the process in which the program is run (along with the process' threads). When a thread executing on the user's behalf then accesses a system resource, the Windows NT operating system performs an authorization check to verify that the user id associated with the thread has permission to access the resource. (See, Custer, *Inside Windows NT* 22, 55–57, 74–81 and 321–326 (Microsoft Press 1993).)

A thread is the basic entity to which the operating system allocates processing time on the computer's central processing unit. A thread can execute any part of an application's code, including a part currently being executed by another thread. All threads of a process share the virtual address space, global variables, and operating-system resources of the process. (See, e.g., Tucker Jr., Allen B. (editor), *The Computer Science and Engineering Handbook* 1662–1665 (CRC Press 1997).)

The Windows NT operating system also provides a way, known as impersonation, to authenticate access from a remote user to resources of a server computer in a distributed network. When a request is received from a remote computer for processing on the server computer, a thread that services the request on the server computer can assume the user id from the thread on the remote computer that made the request. The Windows NT operating system then performs authorization checks on accesses by the servicing thread to system resources of the server computer based on the user id. (See, Siyan, *Windows NT Server 4, Professional Reference* 1061 (New Riders 1996).)

The use of such operating system security features to control access to particular processing services in a server application presents cumbersome distribution and deployment issues. The user ids and user groups are configured administratively per each computer station and/or network, and thus vary between computers and networks. When the particular user ids or groups that will be configured on a computer system are known at the time of developing a server application, the server application can be designed to control access to particular processing services and data based on those user ids and groups. Alternatively, specific user ids or groups that a server application uses as the basis for access control can be configured on a computer system upon deployment of the server application on the computer system. These approaches may be satisfactory in cases where development and deployment is done jointly, such as by in-house or contracted developers. However, the approaches prove more cumbersome when server application development and deployment are carried out separately, such as where an independent software vendor develops a server application targeted for general distribution and eventual installation at diverse customer sites. On the one hand, the server application developer does not know which user ids and groups will be configured on the end customers' computer systems. On the other, the server application developer must force system administrators to configure specific user ids or groups, which at a minimum could lead to an administratively unwieldy number of user configurations and at worst poses a security risk on the computer systems of the developer's customers.

SUMMARY OF THE INVENTION

The present invention provides a way to declaratively and programmatically define access control to processing services of a server application independently of deployment during development of the server application using roles. Roles are logical groups of users that can be assigned at development time, and independent of a specific operating system security configuration until deployment. At development, the server application developer declaratively defines roles and assigns access privileges of the roles to processing services of the server application. At deployment, the installer maps the roles to the security configuration of the computer system on which the server application is installed, such as to specific user ids and groups. A run-time execution environment of the server application performs authorization checks based on the roles and assigned access privileges to control access to the server application's processing services. The developer is thus able to control access by different groups of users to specific server application processing services without prior knowledge of the security configuration at deployment, or requiring a specific security configuration at deployment.

According to a further aspect of the invention, a server application framework provides application programming interfaces that allow programmatic use of role-based security information by the server application to control processing services. At development time, the developer can program code into the server application to perform authorization checks within a processing service to control specific processing based on roles. In particular, the framework includes an application programming interfaces to obtain information as to the role of a current user that initiated the processing service. Within a processing service of the server application, the developer thus has a fine granularity of programmatic control over specific processing in the server application based on the roles that are assigned access privileges to the processing service.

According to another aspect of the invention, the developer declaratively assigns access privileges of roles at package, component, and interface levels of a server application constructed as object-oriented components. In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data. Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class. In an embodiment of the invention illustrated herein, a package is a group of related components of the server application that are run together in a single process on the server computer.

The run-time environment of the server application performs authorization checks for access to a particular package, component or interface of the server application according to the access privileges assigned to roles per package, component and interface. This allows the developer flexible declarative access control at various levels of processing services of the server application.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

The present invention is directed toward a method and system for declarative and programmatic access control of component-based server applications using roles. In one embodiment illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
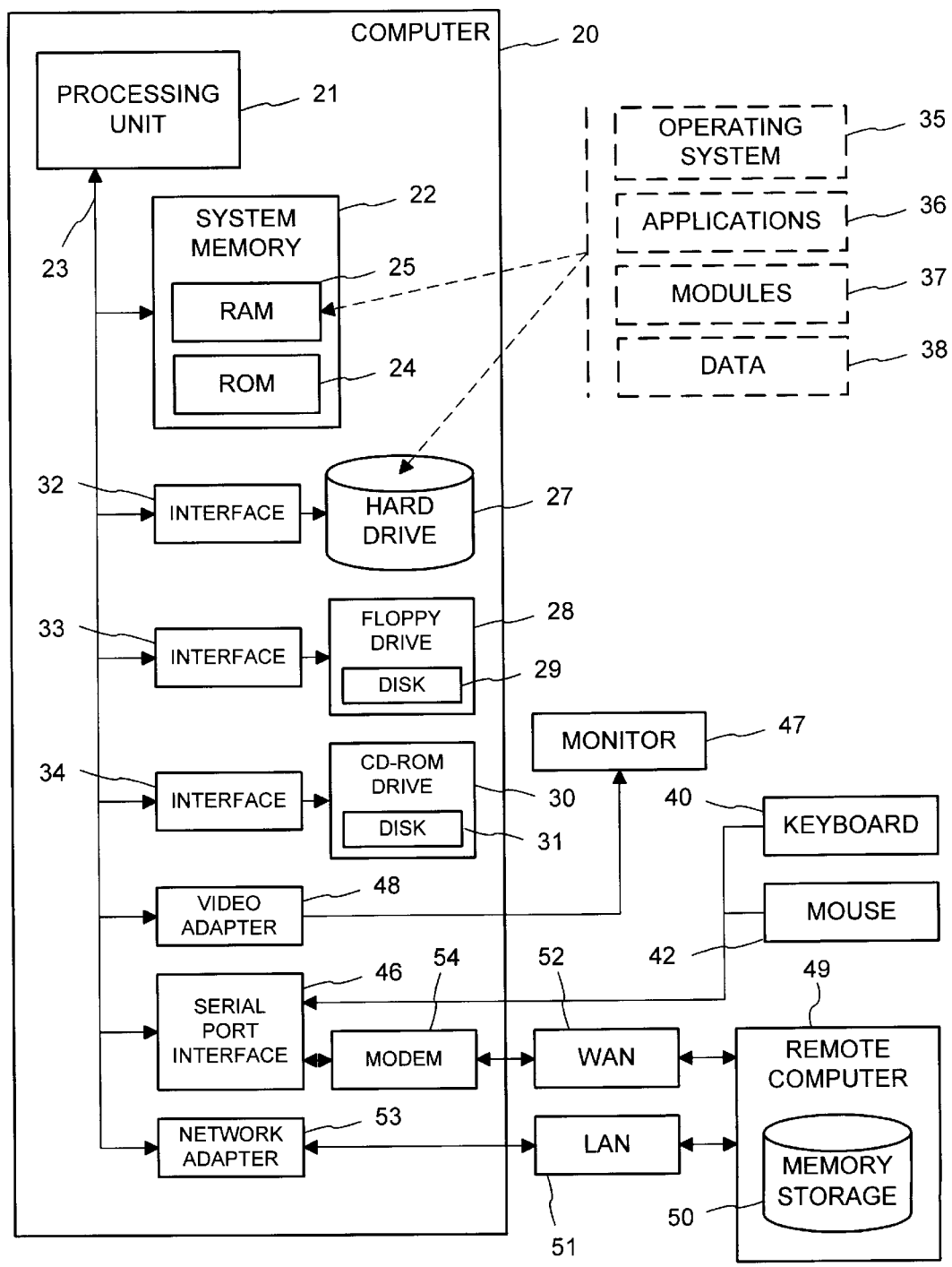
FIG. 1 is a block diagram of a distributed computer system that may be used to implement a method and apparatus embodying the invention for declarative and programmatic access control of component-based server applications using roles.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single—or multiprocessor computer systems, minicomputers, mainframe computers, as well as personal computers, hand-held computing devices, microprocessor—based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Server Application Execution Environment

Figure 2:
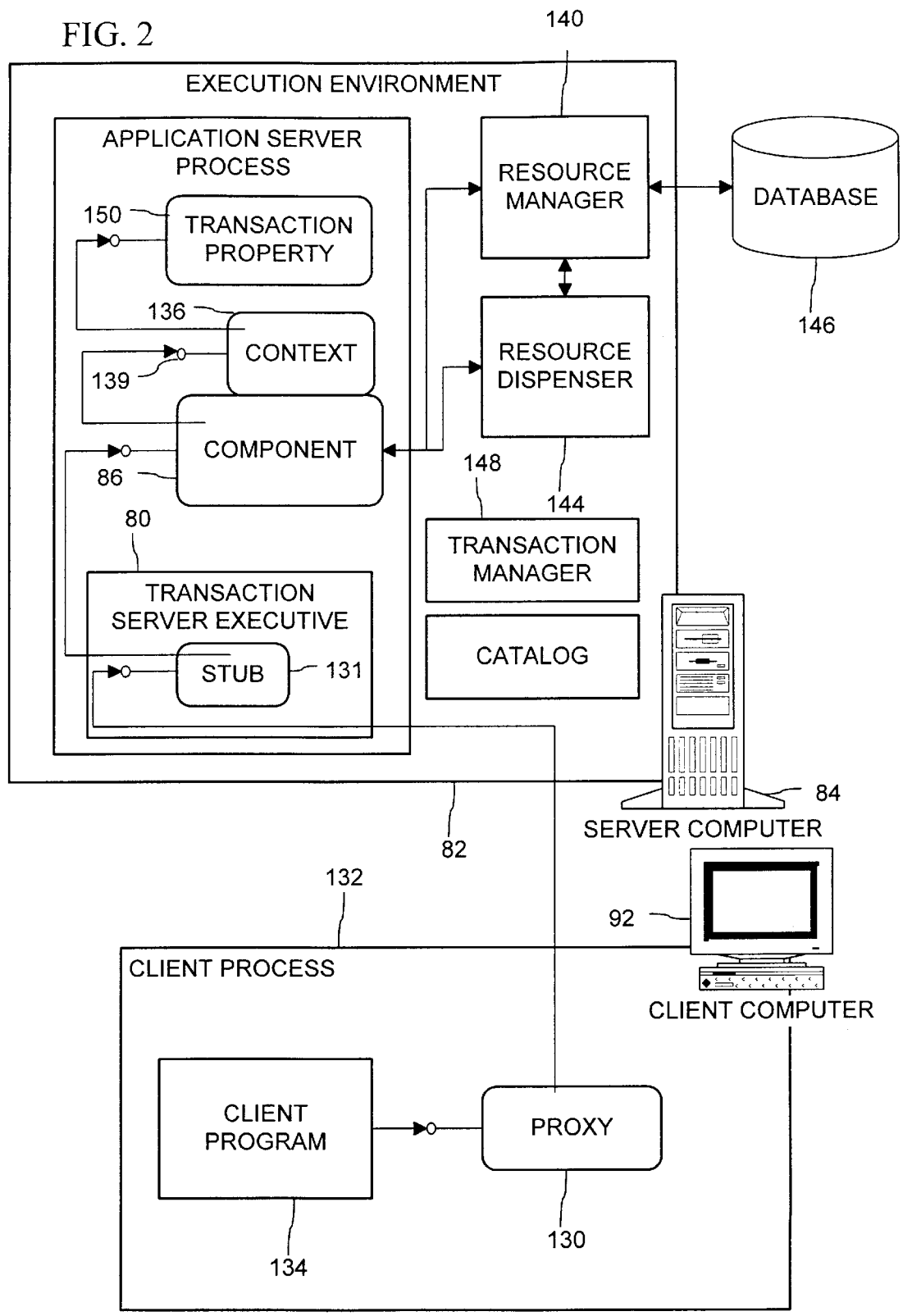
FIG. 2 is a block diagram of a server application component execution environment provided by a server executive on a server computer in the distributed computer system of FIG. 1.

With reference now to FIG. 2, a transaction server executive 80 provides run-time or system services to create a run-time execution environment 80 on a server computer 84 for the server application components (e.g., server application component 86). The transaction server executive also provides services for thread and context management to the server application components 86. Included in the services are a set of API functions, including a GetObjectContext and a SafeRef API functions described below.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes. The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP.

Figure 4:
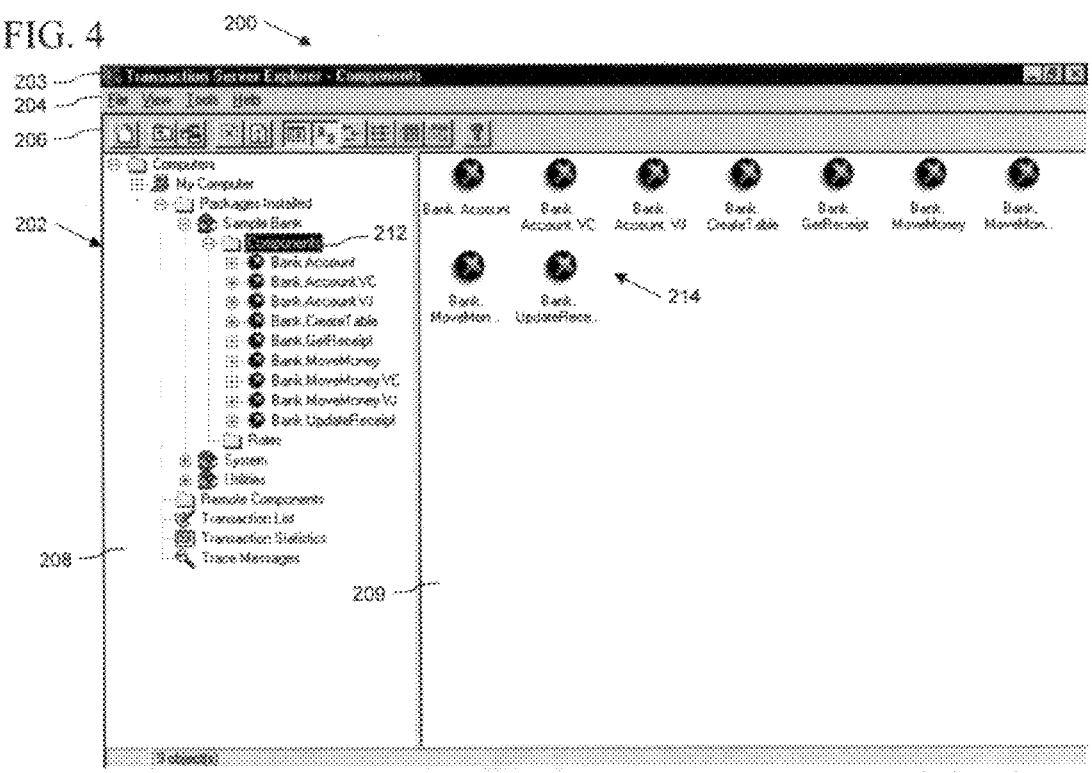
FIG. 4 is a view of a graphical user interface of an administration utility called the Transaction Server Explorer, for grouping server application components into packages and declaring roles.

With reference to FIG. 4, server application components in the illustrated embodiment are grouped as a package to be run together in one ASP 90 using an administration utility called "the Transaction Server Explorer." This utility provides a graphical user interface (shown in FIGS. 4–13) for managing attributes associated with server application components, including grouping the components into packages and defining roles as discussed below.

In a typical installation shown in FIG. 2, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application.

Figure 3:
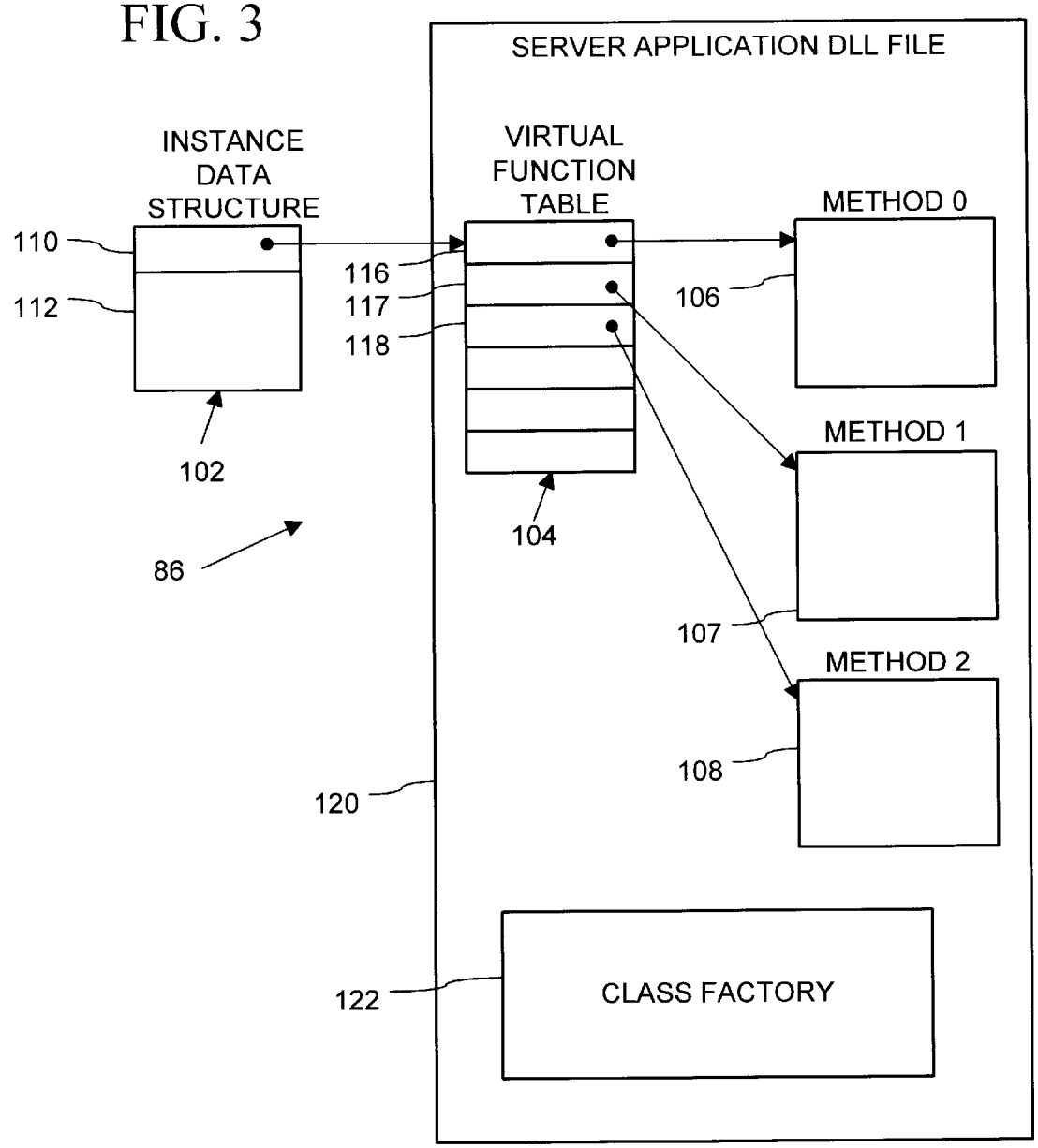
FIG. 3 is a block diagram of the structure of a server application component in the execution environment of FIG. 2.

With reference now to FIG. 3, the server application component 86 (FIG. 2) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 2) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member functions of the component). The server application component that has this behavior is said to be "stateful." The server application component can also be "stateless," which means the component does not hold any intermediate state while waiting for the next call from a client.

In the execution environment 80 of FIG. 2, the server application component 86 is executed under control of the transaction server executive 80 in the ASP 90. The transaction server executive 80 is responsible for loading the server application DLL 300 into the ASP 90 and instantiating the server application component 86 using the class factory 122 as described in more detail below. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 3). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients. Alternatively, the client program 134 can be another server application component that also runs under control of the transaction server executive (either in the same or a separate ASP 90). The client program 134 can reside on the server computer 84 or on a separate client computer 92 as shown in FIG. 2 (in which case the client computer interacts with the server application component 86 remotely through the proxy object 130).

Figure 17:
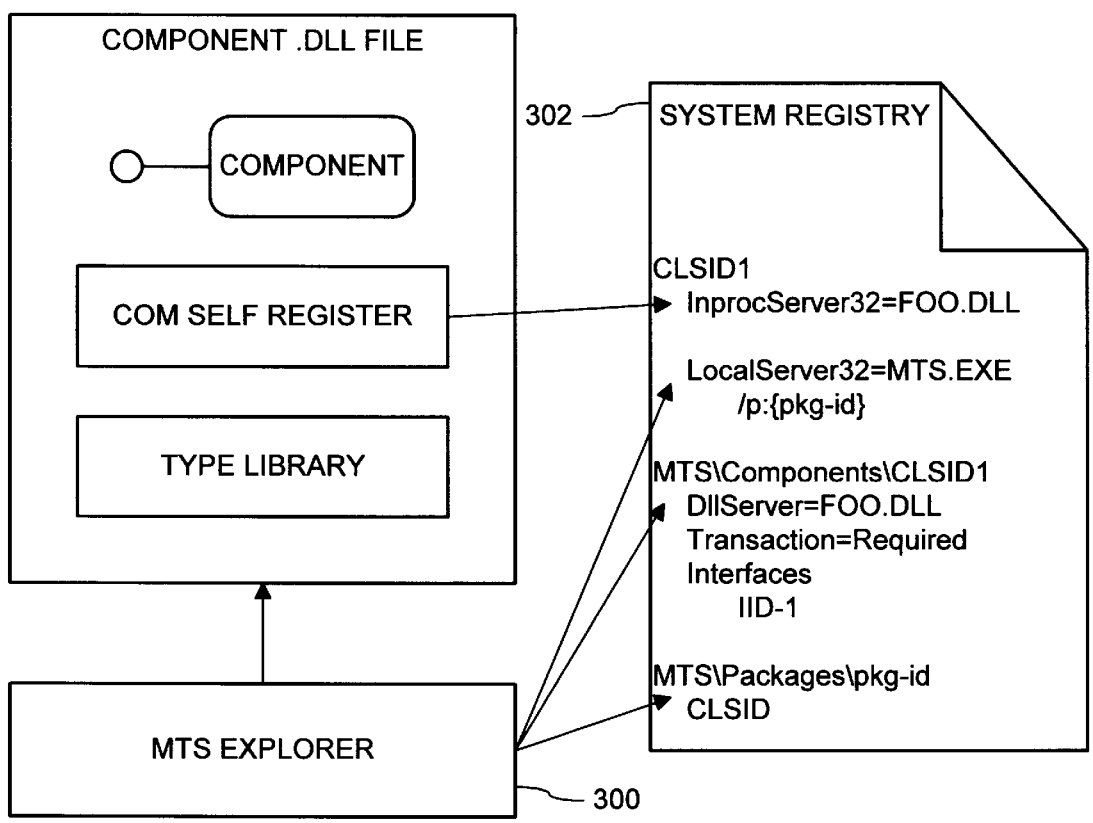
FIG. 17 is a block diagram showing registration of attributes for running a server application component grouped in the package of FIG. 16 in the execution environment of FIG. 2 at installation on the server computer of FIG. 1.

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. Preferably, the server application component is packaged to self register its COM attributes as shown in FIG. 17 and discussed below. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.

```
HKEY_CLASSES_ROOT\CLSID\{AB077646-E902-11D0-B5BE-
00C04FB957D8}\LocalServer32 = C:\WINNT\System32\mtx.exe/
p:{DA16F24B-2E23-11D1-8116-00C04FC2F9C1}
```

When the server application component 86 is run in the execution environment 80, the transaction server executive 80 maintains a component context object 138 associated with the server application component 86, including while the server application component 86 is deactivated. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction (i.e., an atomic unit of work that is either done in its entirety or not at all) in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 2, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Transaction Processing With Server Application Components

The illustrated execution environment 80 also provides support for transaction processing conforming to the ACID properties and using the well known two phase commit protocol. In the illustrated execution environment 80, one or more server application components that participate in a transaction (i.e., an atomic unit of work that is either done in its entirety or not at all) will each have a transaction property object 150 associated with their component context object 136 to represent the transaction. The transaction server executive 80 creates the transaction property object 150 when the transaction is initiated, and associates the transaction property object with the component context object of each server application component in the transaction.

While the server application component 86 is associated with the transaction property object 150, the transaction server executive automatically associates the transaction property object 150 with any other server application object that is created by the server application component 86 or resource that is obtained by the server application component 86. For example, a money transfer operation in an on-line banking server application can be implemented in a "transfer" server application component that creates two "account" server application components to debit and credit the transferred amount to the affected accounts. Thus, when the transfer component creates the account components, the transaction server executive automatically associates the account components with the transfer component's transaction property object so that work of the individual account component in the money transfer is performed as a single atomic action. Also, any resources obtained by the server application component 86 from the resource manager 140 or resource dispenser 144 are associated with the component's transaction property object 150 so that services performed by the resource manager or dispenser on the component's behalf also are encompassed within the transaction. For example, when the server application component 86 allocates a database connection using the ODBC Resource Dispenser while associated in a transaction, the connection is automatically enlisted on the transaction. All database updates using the connection become part of the transaction, and are either atomically committed or aborted.

The server application component 86 can affect the outcome of a transaction using "SetComplete" and "SetAbort" member functions of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily. On the other hand, the server application component 86 calls the SetAbort member function to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance.

The transaction server executive 80 causes the transaction to complete (i.e., the transaction commits or aborts) when the server application component for which the transaction was initiated (termed the "root" of the transaction) indicates work in the transaction is complete (i.e., with the SetComplete or SetAbort function call). The transaction commits unless any of the components and resources enlisted in the transaction indicates the transaction is not to be committed, such as by calling the SetAbort function. Otherwise, the transaction is aborted.

Overview Of COM Object Instantiation In OLE

As with other COM objects, the client program 134 (FIG. 2) must first request creation of an instance of the server application component 86 (FIG. 2) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateGUID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating The Server Application Component

With reference still to FIG. 2, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86.

When created with this first approach, the properties in the component context object 136 associated with the new server application component 86 are not inherited from the client program that requested its creation. More particularly, the transaction server executive 80 initiates a new activity (described below) and sets the activity id in the new server application component's context to indicate the new activity. The transaction server executive 80 sets the client id in the new component's context to indicate the client program 134 that requested the component's creation. The transaction server executive 80 also initiates a transaction for the new component is one is required. Because of this limitation, the first approach typically is used only for base clients to create a server application component.

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component.

In this second approach, the server application component accesses its component context object using a service of the transaction server executive, called the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are returned by the transaction server executive 80 as safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 3) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Role-Based Security

In accordance with the invention, security for the server application component 86 in the illustrated execution environment of FIG. 2 is declaratively and programmatically defined at the time of server application development using roles. A role is a symbolic name that represents a logical class of users for a package of components. With the abstraction of roles, the server application's developer can fully configure security authorization to the server application at multiple levels, independent of the security configuration on the server computer 20 (FIG. 1) on which the server application is eventually deployed. Where the server application is to be deployed on a server computer running the Microsoft Windows NT Server operating system for example (as in the illustrated embodiment), the server application's developer can fully configure the server application's security without knowledge of the specific user ids and groups configured on the server computer.

Role Properties

Roles in the illustrated execution environment 86 (FIG. 2) have three properties, a name, a description and a role id. The name of a role is a text string that identifies the logical class of users. For example, roles in an on-line banking server application may be assigned the names, "customer," "junior teller," "senior teller," "branch manager," "vice president," and "president," to identify the corresponding logical classes of users represented by the roles. The description property is a text field that describes the logical class of users or purpose of the role to aid in administration and management of the roles, such as where roles having identical names are used in different packages deployed on a same server computer. The role id is a GUID unique to the role, and thus serves to differentiate roles even where the same name is used in different packages.

Declarative Access Control

With reference to FIGS. 4–10, the developer of the server application for the illustrated execution environment 82 (FIG. 2) declares roles and access privileges of the roles at development time using the Transaction Server Explorer administration utility. The illustrated Transaction Server Explorer is an application program that runs on a Windows NT Server-equipped computer. The Transaction Server Explorer provides a graphical user interface 200 having an application window 202 with a title bar 203, a menu bar 204 and a button bar 206, that are conventional of Windows applications. The application window 202 hosts two panes 208–209 for displaying and navigating the structure of the server application. In a left pane 208, the Transaction Server Explorer displays a hierarchical tree graph of the server application structure. The right pane 209 displays contents on a particular server application construct (e.g., package, component, role, etc.) selected in the left pane 208. For example, as shown in FIG. 4, a "components" folder 212 representing the components grouped into a package named "Sample Bank" is selected in the left pane 208, causing the right pane 209 to display icons 214 representing the components.

Figure 5:
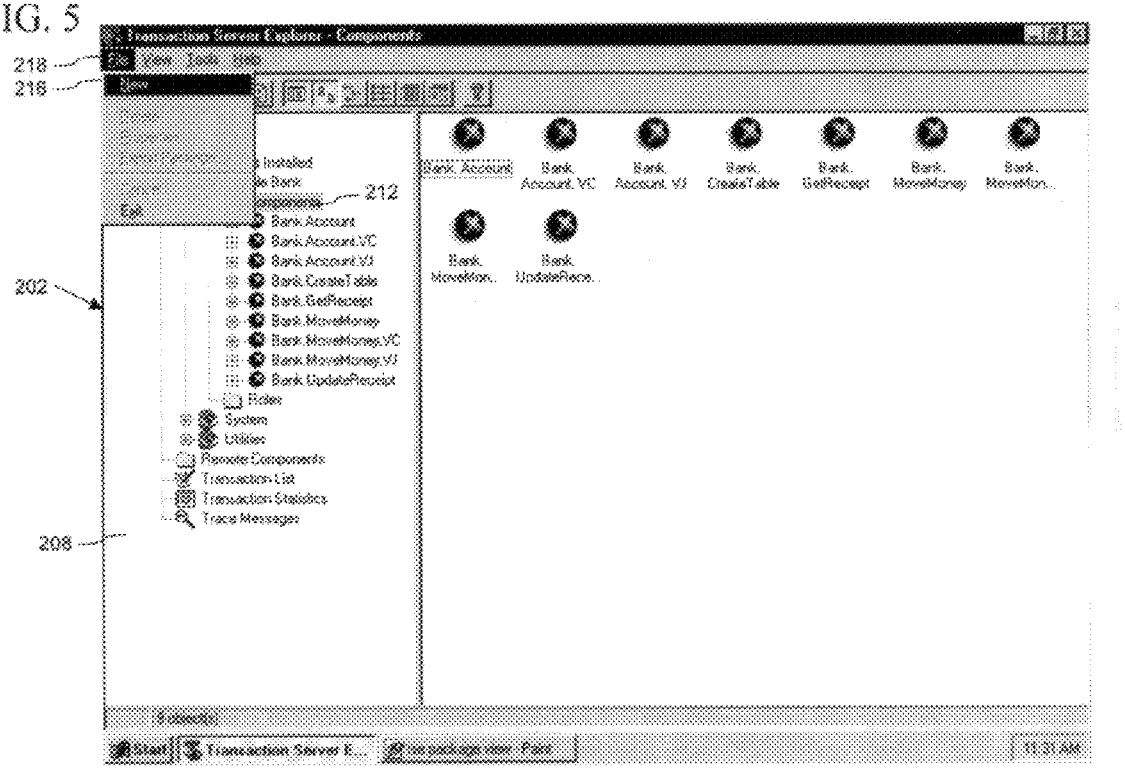
FIGS. 5 and 6 are views of a feature of the Transaction Server Explorer's graphical user interface for grouping server application components into packages.
Figure 6:
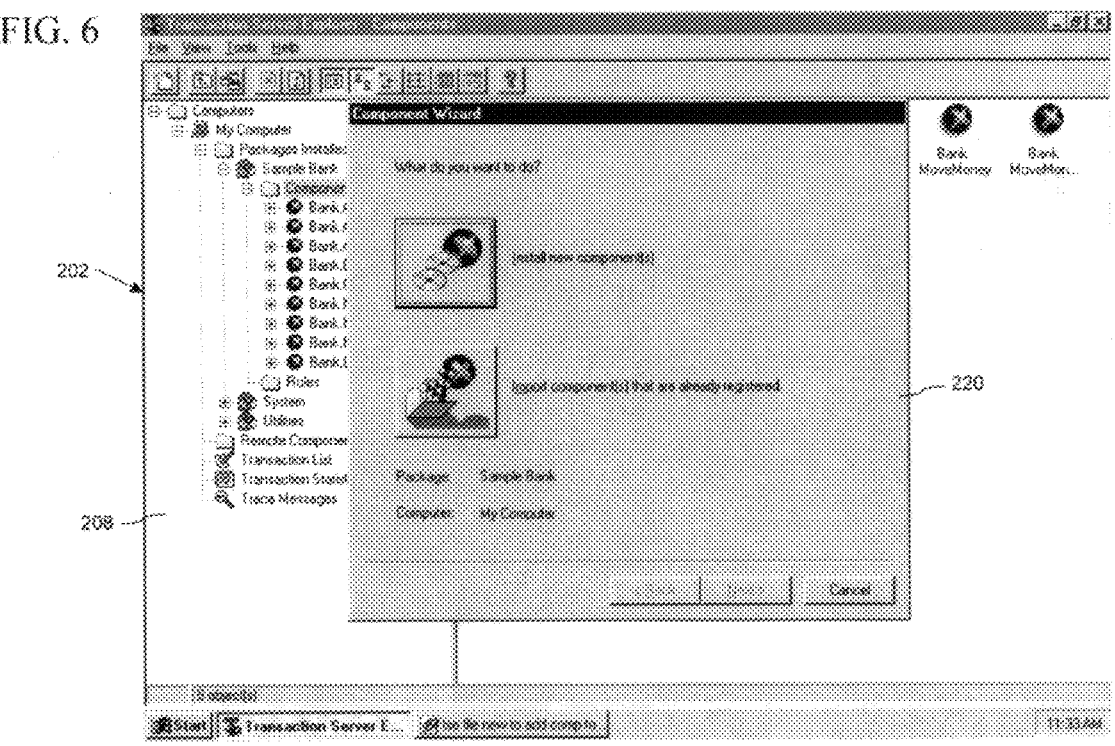
Figure 13:
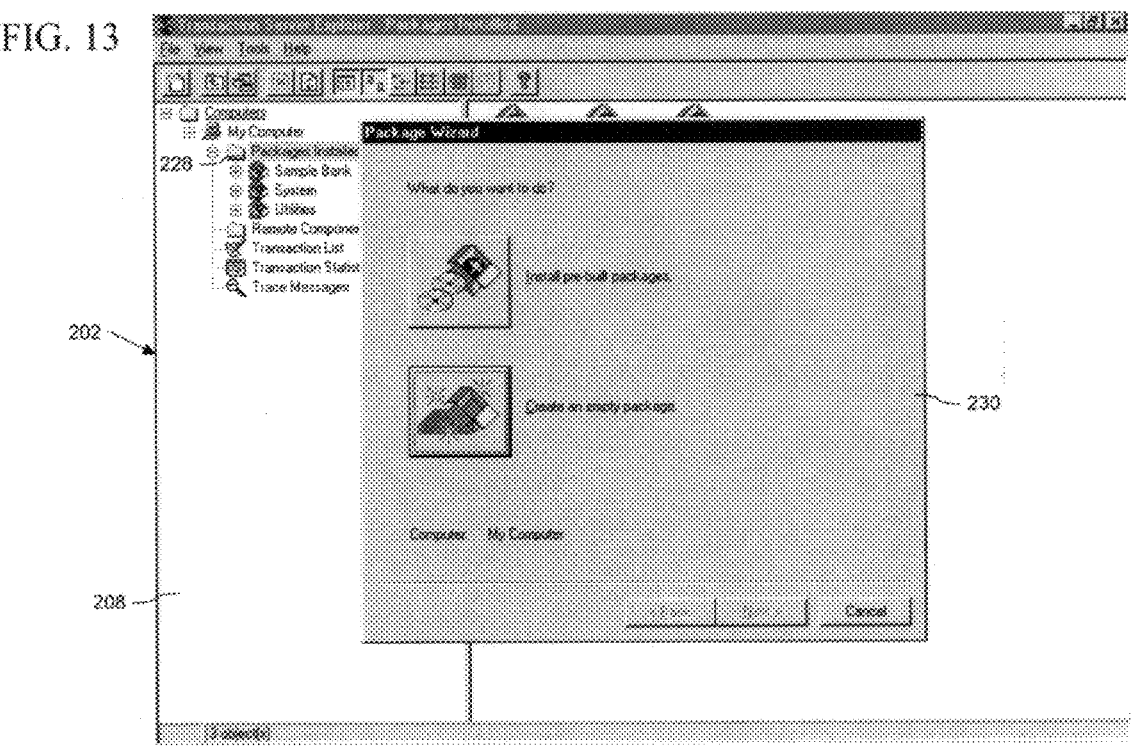
FIG. 13 is a view of a feature of the Transaction Server Explorer's graphical user interface for deploying a package having pre-defined role-based access privileges.

Using the Transaction Server Explorer, the developer groups a collection of related components of the server application into the package. As shown in FIGS. 5 and 6, the developer can add server application components that the developer has built with a suitable programming tool, such as Microsoft Visual Basic, Microsoft Visual C++, Java or other programming system capable of building COM Objects, into the package. With the components folder 212 of the desired package selected in the left pane 208 of the Transaction Server Explorer, the developer activates the new command 216 on the file menu 218. This launches an interactive dialog called the "component wizard" dialog 220 which prompts the developer to input information specifying the component to be added, and registration properties needed to run the component in the execution environment 82 (FIG. 2). As shown in FIG. 13, the developer begins a new package in a like manner, by activating the file:new menu command 216 (FIG. 5) with the "packages installed" folder 228 selected in the left pane 208, then responding to the prompts in an interactive "package wizard" dialog 230.

Figure 7:
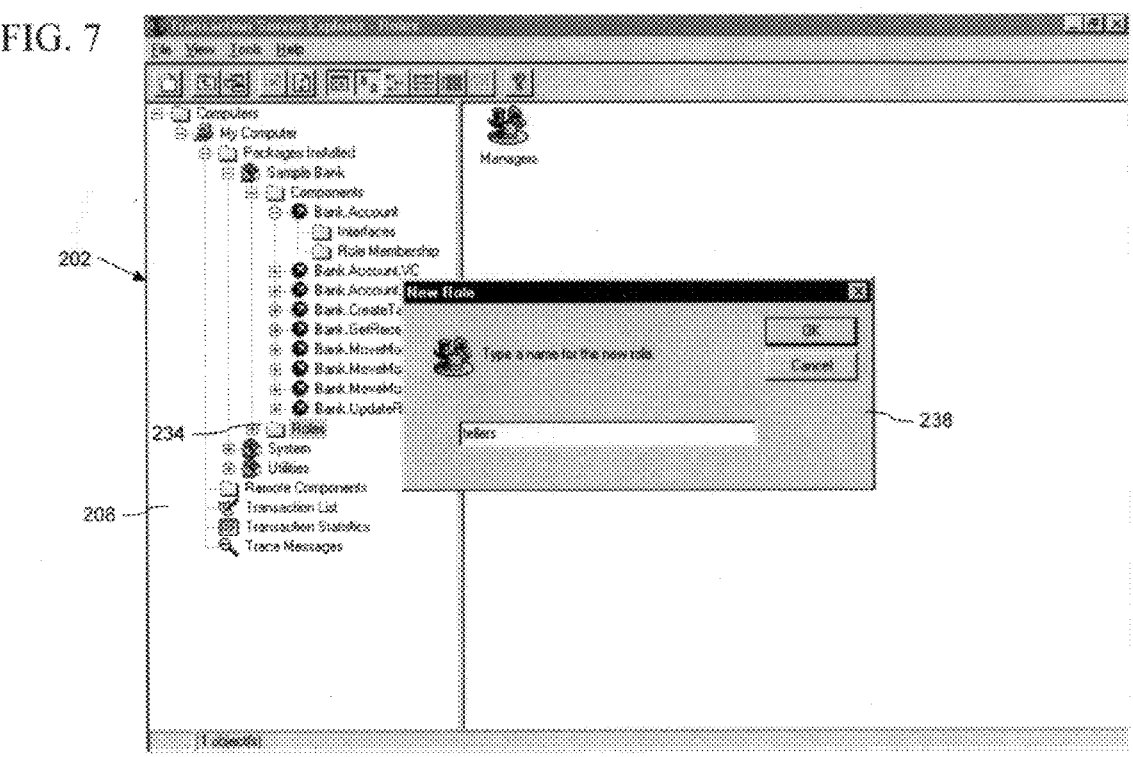
FIGS. 7 and 8 are view of a feature of the Transaction Server Explorer's graphical user interface for defining roles and assigning package level access privileges of the roles.

With a collection of server application components grouped into a package (such as, the "bank account" and other components in the "sample bank" package shown in FIG. 4), the developer can declare roles applicable to the package and assign access privileges to the package, its components and the components' interfaces for the roles. In the Transaction Server Explorer application window 202 as shown in FIG. 7, the developer selects the "roles" folder 234 of the desired package (e.g., the "sample bank" package) in the left pane 208 and activates the file:new menu command 216 (FIG. 5) to bring up a "new role" dialog 238. The developer then designates a name for the new role in the "new role" dialog. After entering a name and clicking "ok" in the new role dialog, the Transaction Server Explorer generates a GUID to use as the role id and adds the new role to the roles folder for the package.

Figure 8:
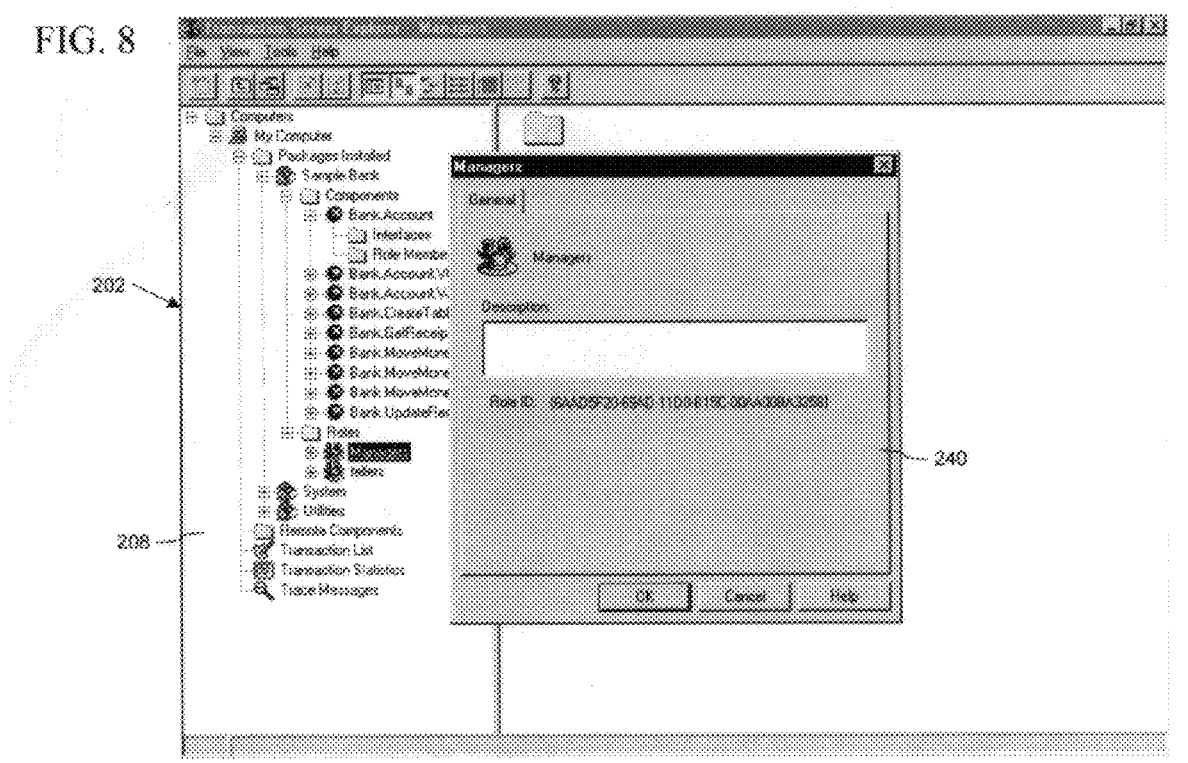

As shown in FIG. 8, the developer can view the properties of a role and input text of a role's description property in a role property sheet 240. Per Windows NT Server operating system conventions, the property sheet 240 is accessed by "right-clicking" the name and icon of the desired role in the left pane 208 (FIG. 9) or right pane 209 (FIG. 8) and activating a "properties" menu command.

With reference again to FIG. 7, the developer assigns access privileges of a role to the package by adding the role to the roles folder of the package as just discussed. As described in the Authorization Checking section below, this allows user threads operating under the role to have access to the package. The developer can additionally assign access privileges of certain subsets of the roles having access privileges to the package to particular components and component interfaces using the Transaction Server Explorer. This allows the developer to declaratively configure different logical classes (i.e., roles) to have different levels of access to particular processing services of the server application.

In the sample bank package for example, the developer can use declarative access control with roles to allow only certain users (e.g., in an abstract class of "loan officers") to access certain processing services (e.g., relating to loans) of the server application by granting component-level and interface-level access privileges. The developer adds a loan component which encapsulates loan related processing services to the package with the Transaction Server Explorer with the procedure discussed above and shown in FIGS. 5 and 6, and adds roles for "loan officers" and "tellers" with the procedure discussed above and shown in FIG. 7. The developer then limits access to the loan processing services to the loan officers role by granting access privileges to the "loan officers" role, but omitting the roles (e.g., tellers) from the loan component's role membership folder that are to be excluded from access to the loan processing services implemented by the loan component.

Figure 9:
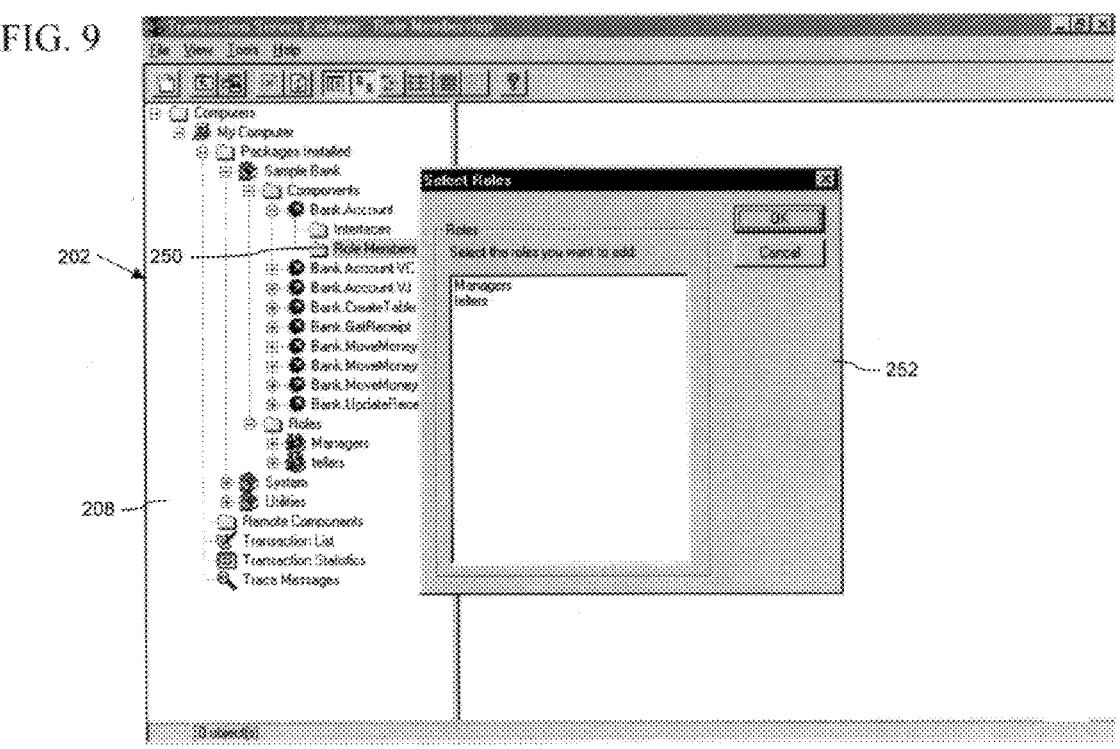
FIG. 9 is a view of a feature of the Transaction Server Explorer's graphical user interface for assigning component level access privileges of the roles.

With reference to FIG. 9, the developer assigns access privileges on the component level in the Transaction Server Explorer by selecting a "role membership" folder 250 under the desired server application component of the package. The developer then activates the file:new menu command 116 (FIG. 5) to bring up a "select roles" dialog 252. In the select roles dialog 252, the Transaction Server Explorer displays a list of the roles in the package. The developer selects a role from the list to be added to the role membership folder 250, which assigns the selected role to have access privileges to the component.

As a further example, the developer also can declaratively assign interface-level access privileges to configure selective access to certain processing services of the sample bank package. The developer builds the loan component to provide separate interfaces to the loan processing services it encapsulates, such as a get loan interface for reading loan information and a set loan interface for setting up a loan. The developer then assigns both tellers and loan officers roles to have access privileges to the get loan interface, but only assigns the loan officers role to have access privileges to the set loan interface.

Figure 10:
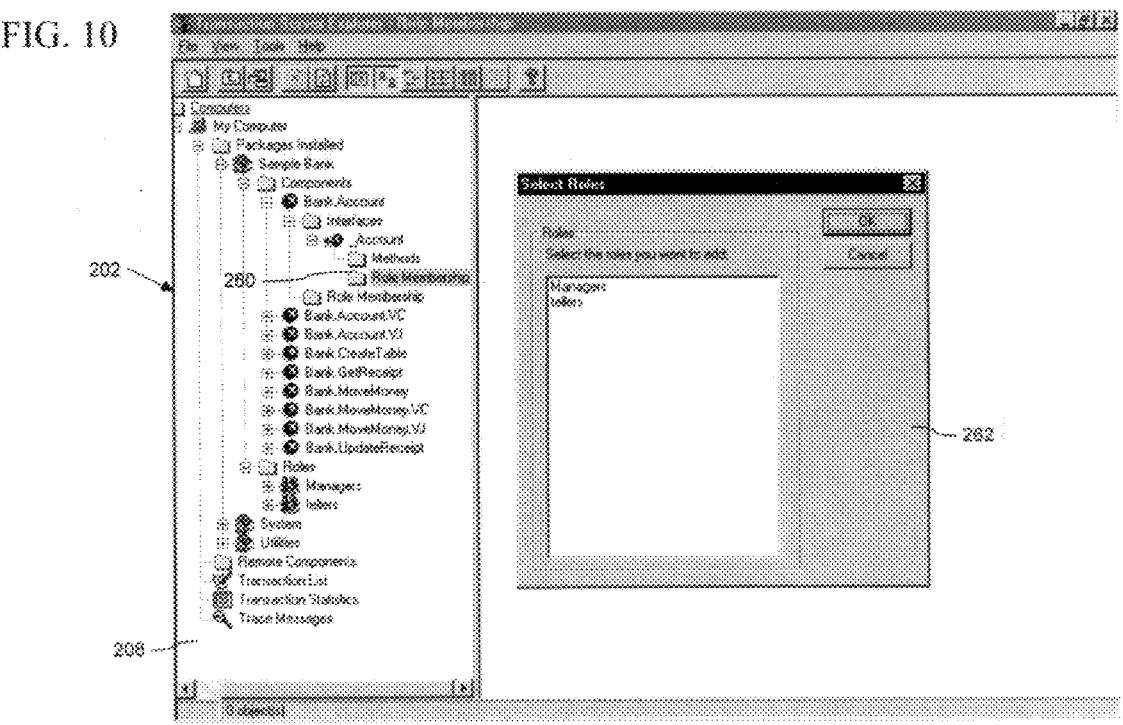
FIG. 10 is a view of a feature of the Transaction Server Explorer's graphical user interface for assigning interface level access privileges of the roles.

With reference to FIG. 10, the developer assigns access privileges on the interface level in the Transaction Server Explorer by selecting a "role membership" folder 260 under the desired interface of the server application component of the package. The developer then activates the file:new menu command 116 (FIG. 5) to bring up a "select roles" dialog 262. In the select roles dialog 262, the Transaction Server Explorer displays a list of the roles in the package. The developer selects a role from the list to be added to the role members folder 260, which assigns the selected role to have access privileges to the interface.

Figure 11:
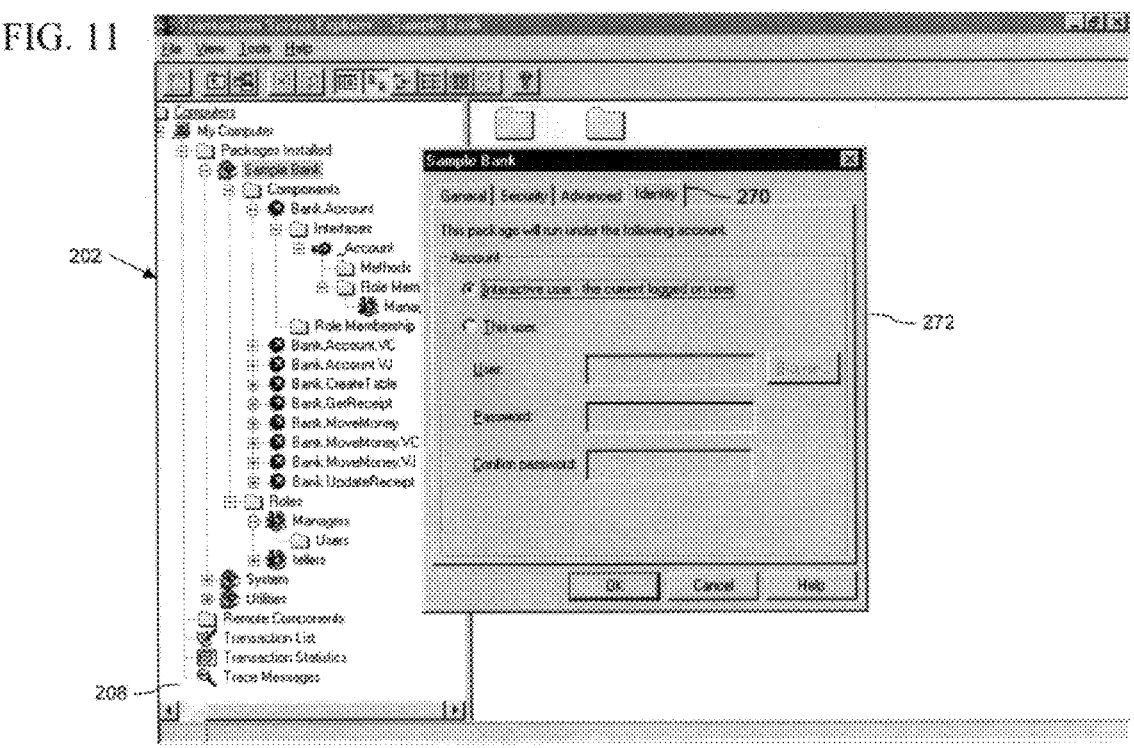
FIG. 11 is a view of a feature of the Transaction Server Explorer's graphical user interface for establishing a process identity at development under which a package is run in the execution environment of FIG. 2.

With reference to FIG. 11, the developer also establishes a package identity at development that defines the identity of the ASP 90 in which the package is run at execution. The ASP 90 can be run either as "interactive user" or as a specified Windows NT user id. When run as interactive user, the ASP 90 assumes the identity of the user currently logged on to the server computer. Accordingly, when the package identity is declared as interactive user, a user must be logged on to the server computer for the package to be run. On the other hand, when run as a specified Windows NT user id, the Windows NT operating system runs the process as a separate "windows station," meaning that no dialog boxes will be displayed at the server computer. The developer assigns the package identity as part of the interactive package wizard dialog 230 (FIG. 13), or on a "identity" tab 270 of a package property sheet 272 (FIG. 11). The package property sheet 272 is accessed by activating a file:properties menu command.

Mapping Roles to Security Configuration at Deployment

Figure 12:
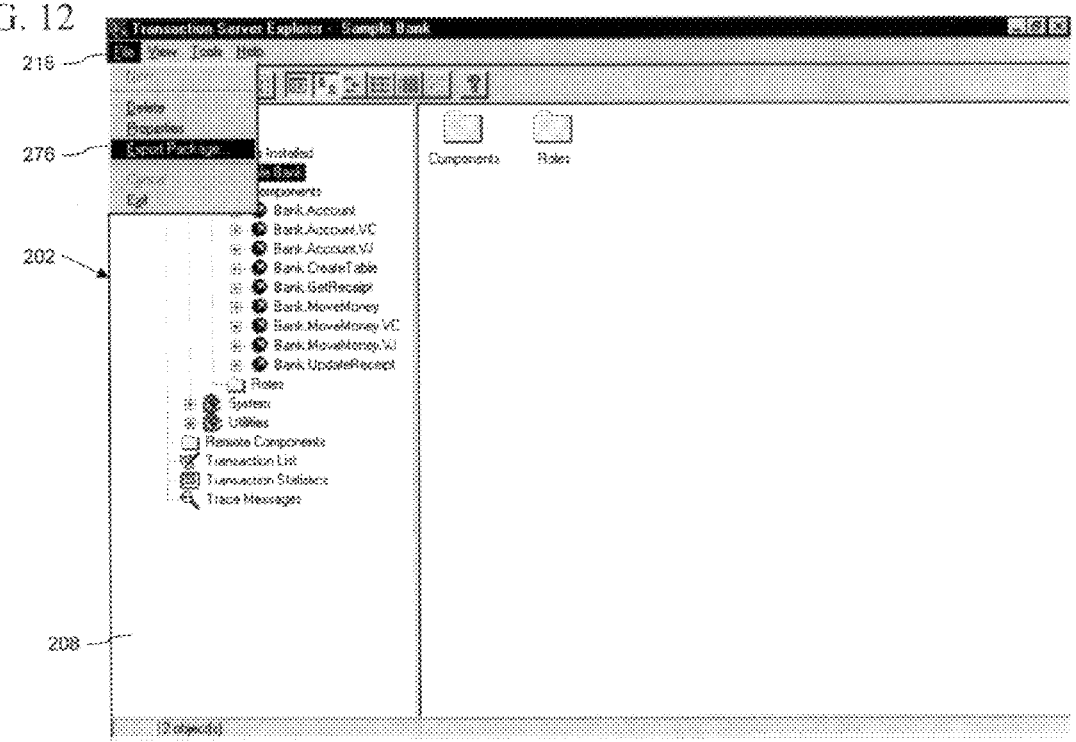
FIG. 12 is a view of a feature of the Transaction Server Explorer's graphical user interface for packaging server application components with role-based access privileges defined at development.
Figure 16:
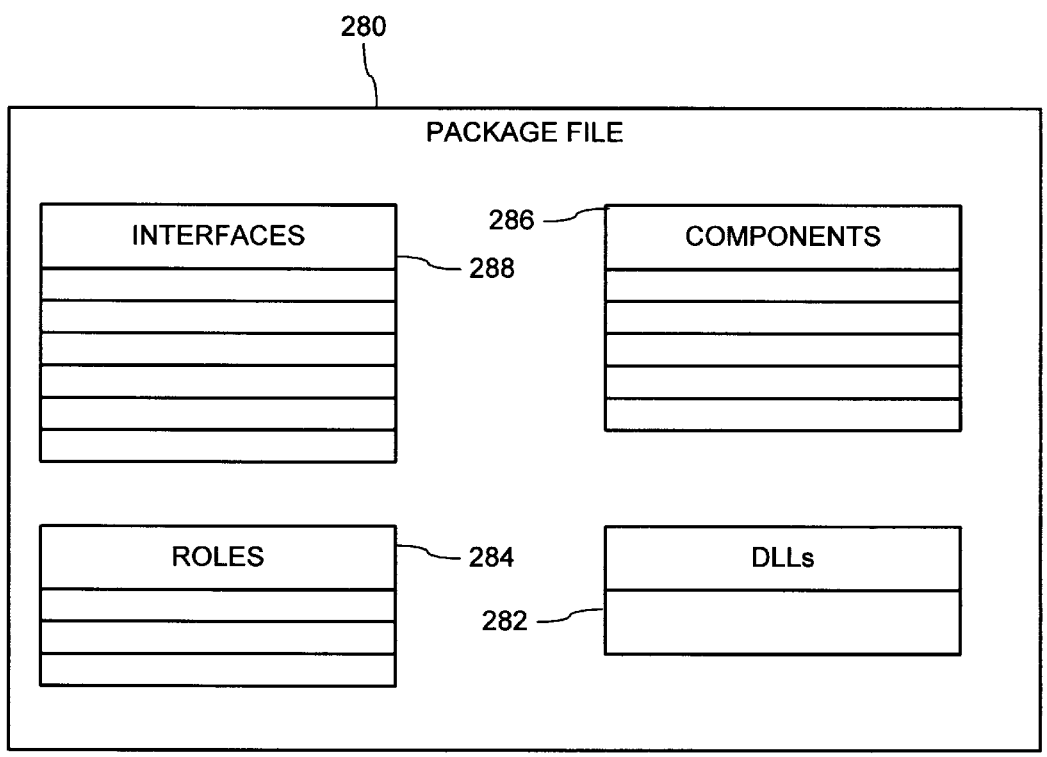
FIG. 16 is a block diagram of a file structure of a package of server application components with role-based access privileges defined at development.

With reference to FIGS. 12 and 16, the package serves as the unit of deployment of a server application in the illustrated execution environment 82 (FIG. 2). After defining role-based security for the server application as discussed in the Declarative Access Control section above, the developer exports the package from the Transaction Server Explorer as shown in FIG. 12 by selecting the desired package in the left pane 208 and activating an export package command 276 from the file menu 218. This causes the Transaction Server Explorer to produce a package file 280 (FIG. 16). The developer distributes this package file 280 for deployment on the computer systems on which the server application is to be run.

In the package file 280, the Transaction Server Explorer bundles together DLL files 282 which implement the server application components that are grouped in the exported package, together with data structures containing the declared role-based security configuration of the package. These data structures include a roles data structure 284, a components data structure 286, and an interfaces data structure 288. The roles data structure stores the properties (i.e., name, description and role id) of the roles that were defined by the developer for the package as discussed above and shown in FIGS. 7 and 8. The components data structure 286 stores the roles' component-level access privileges that were declared by the developer as discussed above and shown in FIG. 9, whereas the interfaces data structure 288 stores the roles' interface-level access privileges declared by the developer as discussed above and shown in FIG. 10.

With reference now to FIG. 13, the package containing the server application is deployed on the server computer 20 (FIG. 1), such as by a systems administrator, again using the Transaction Server Explorer. In the Transaction Server Explorer, the administrator selects the packages installed folder 228 in the left pane 208 and activates the file:new menu command 216 (FIG. 5). This causes the Transaction Server Explorer to display an interactive "package wizard" dialog 230 in which the administrator initiates installation of the pre-built package.

With reference to FIG. 17, the Transaction Server Explorer 300 installs the package by storing the server application component's DLL files 282 (FIG. 16) on the hard drive 27 (FIG. 1) of the server computer 20, and also causing the component to self register (using conventional COM Object self registration techniques) in the Windows NT system registry 302. In addition, the Transaction Server Explorer 300 registers information for executing the component in the illustrated execution environment 82 (FIG. 2), including the transaction server execution attribute described above. The Transaction Server Explorer also transfers the role-base security configuration for the package into the system registry 302, or alternatively another configuration file on the server computer 20 (FIG. 1).

Figure 14:
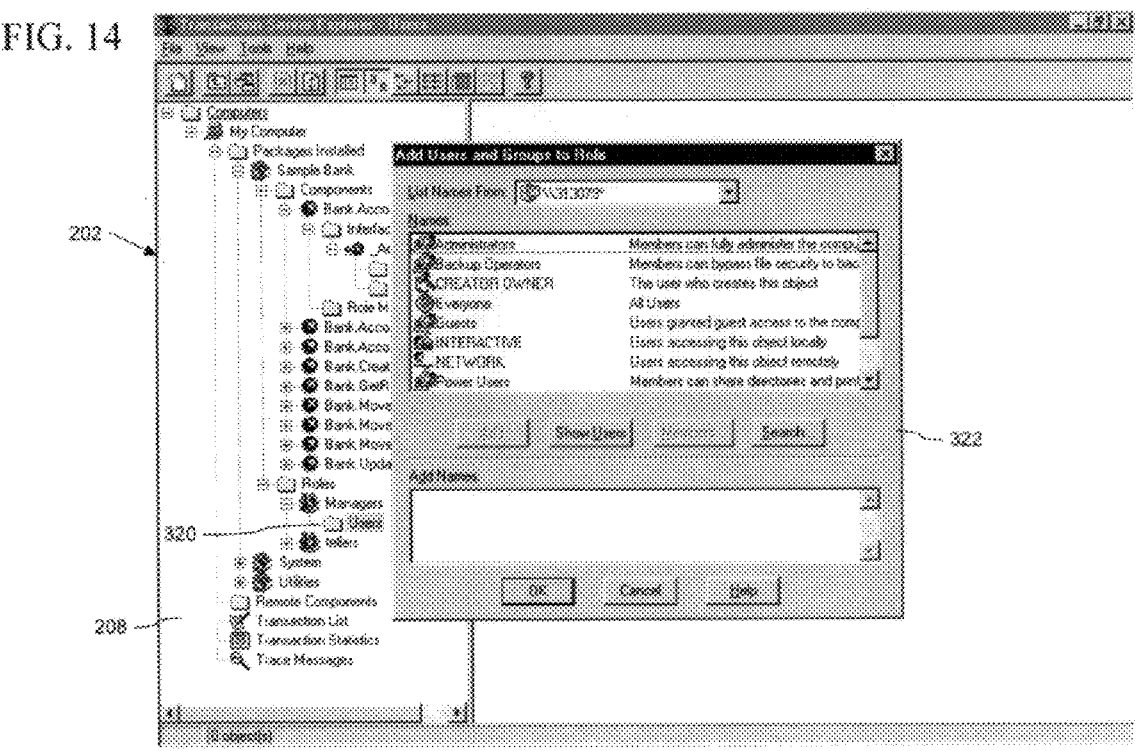
FIG. 14 is a view of a feature of the Transaction Server Explorer's graphical user interface for mapping users to roles at deployment of a package having pre-defined role-based access privileges.

With reference now to FIG. 14, the administrator next maps the developer-defined roles security configuration to the security configuration of the server computer 20, such as by mapping (also referred to as "binding") each developer-defined role to specific user ids or groups that are configured on the server computer 20. The administrator can define new user groups to maintain one-to-one correspondence of user groups to the developer-defined roles. In the Transaction Server Explorer, the administrator maps a role to particular user ids and/or groups by selecting a "users" folder 322 under the desired role in the left pane 208 and activating the file:new menu command 216 (FIG. 5). This causes the Transaction Server Explorer to display an "add users and groups to role" dialog 322, which shows a list of the user ids and groups configured on the server computer 20. The administrator selects user ids and/or groups from the list to add to the role's users folder 320, which creates a mapping between the role and the designated user ids and/or groups.

The illustrated execution environment 82 (FIG. 2) also requires the administrator to configure Windows NT Server impersonation level and authentication level settings on client and server computers 84, 92 (FIG. 2). The administrator sets the impersonation level of both client and server computers to impersonate. If Impersonation isn't set to Impersonate, the role-based declarative security always fails. The administrator can set this property with the Distributed COM Configuration Properties (dcomcnfg.exe) utility.

Figure 15:
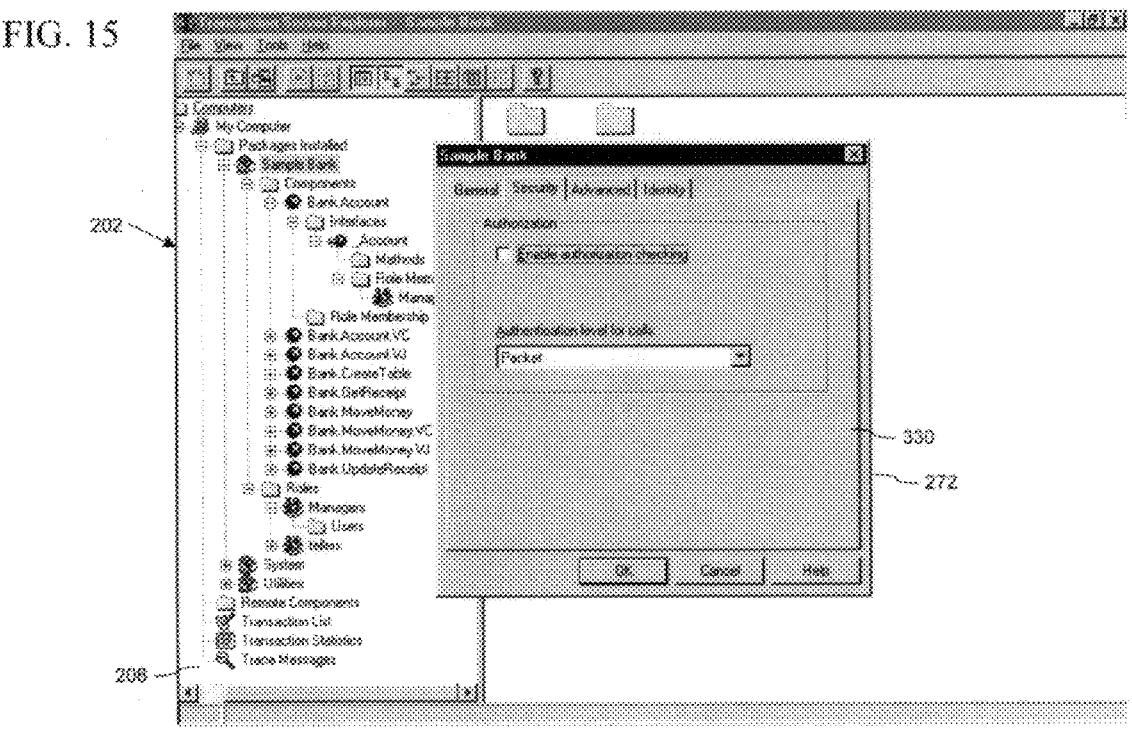
FIG. 15 is a view of a feature of the Transaction Server Explorer's graphical user interface for setting an authentication level and enabling authorization checking for the package.

The administrator also sets the authentication level of base client processes to be greater than or equal to the authentication level set in the package (the authentication level of server processes is configured at the package). The authentication level of the package is set in the Transaction Server Explorer (on a security tab 330 of the package's property sheet 272 as shown in FIG. 15) and defines the minimum authentication level required to call into the package. If the authentication level isn't properly configured, the server process can't service the client base process call. The authentication level can be set in one of two ways. First, the client application calls the DCOM API ColnitializeSecurity to set the process authentication level. Second, if ColnitializeSecurity isn't called by the client base process, the default authentication level is used. The administrator can set the appropriate default authentication level by using dcomcnfg.exe. Declarative access control thus can be enabled or disabled by appropriately setting the authentication level of the package higher than the client processes. The administrator also can set an option to disable authentication checking on the security tab 330 of the package's property sheet 272 (FIG. 15).

If the server application has a component that makes callbacks into the client, the administrator also must configure Access Security such that the server is allowed to call back into the client. There are three ways to set access security. First, the client can call ColnitializeSecurity and directly set the Access Security for the process. Second, if the client process represents a DCOM application, the administrator can set the corresponding Application Access Security setting by using dcomcnfg.exe. Third, the administrator can set the Default Security, Default Access Permissions property by using dcomcnfg.exe. This setting applies to all DCOM calls coming into the client computer 92 (FIG. 2).

After deployment, the administrator can modify the roles and assigned access privileges that were defined by the developer. The roles and assigned package, component and interface-level access privileges are modified in the Transaction Server Explorer in the same ways described above that they are originally defined at development.

Authentication Checks

Figure 18:
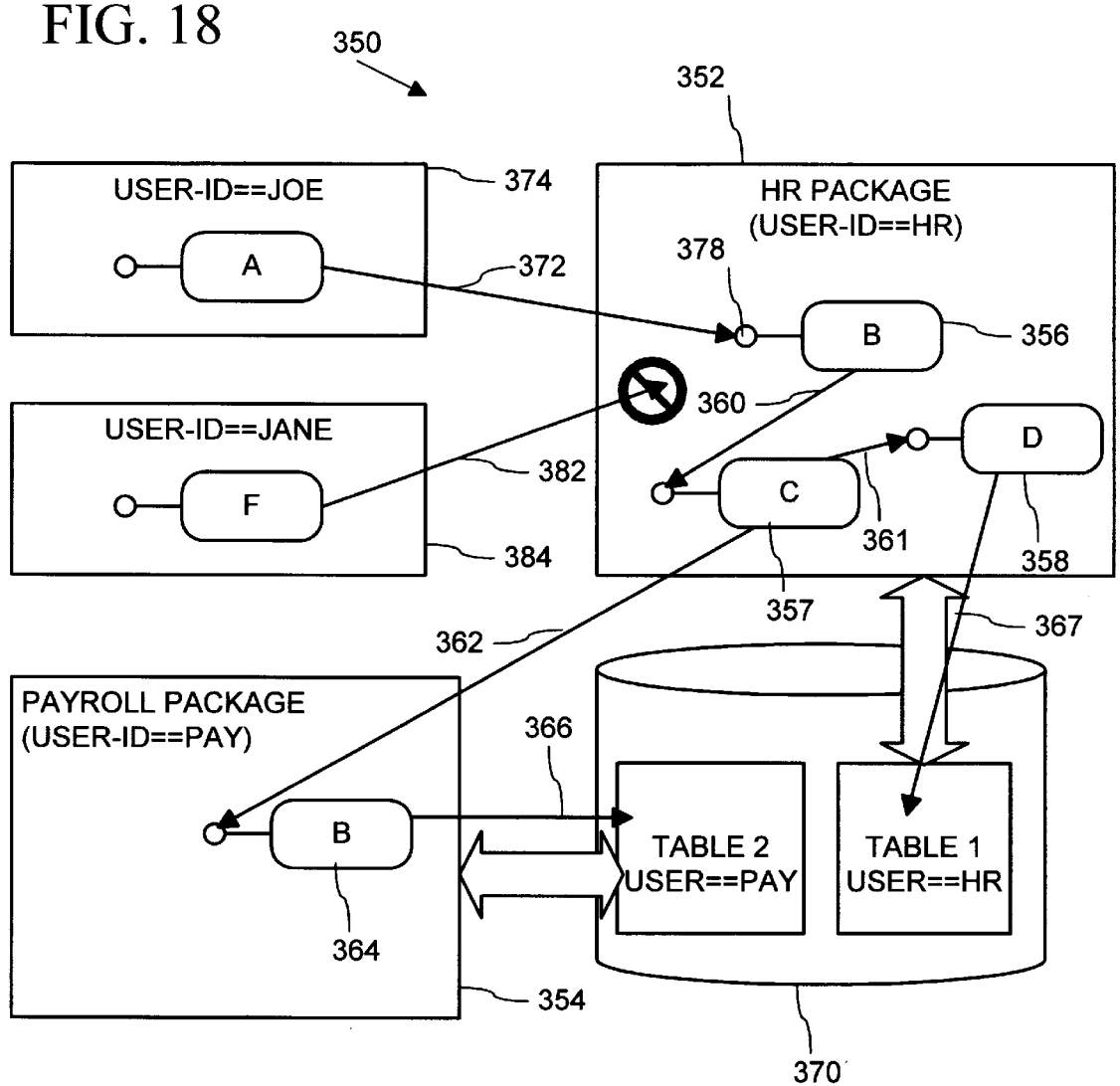
FIG. 18 is a block diagram illustrating authorization checks based on roles.

With reference to FIG. 18, authentication checks are performed in the illustrated execution environment 82 of FIG. 2 at run-time of the server application components based on the development declared roles (as mapped to the computer system's security configuration at deployment). These authorization checks localize security authorization to the component and interface levels.

The illustrated execution environment 82 performs security authorization checks on calls that cross the package boundary (e.g., from a client process into the server application), rather than spread throughout the server application. Once the initial authorization check to pass the package boundary succeeds, any calls between components or access to other resources are made under the identity of the ASP 90 (FIG. 2), i.e., the identity established by setting the package identity which can be done at development as described above. This has several benefits, including a single point for security authorization management, and higher availability and multiplexing of resources, such as database connections from server application processes. However, the security model requires the developer to carefully design server component interaction and declaration of roles and access privileges.

Accordingly, in an example running server application 350 shown in FIG. 18 having a human resources ("HR") package 352 and a payroll package 354 (which the execution environment 82 runs in separate ASPs), calls 360–361 between server application components 356–358 in the human resources package 352 are made without authorization checks. Calls made by the server application components in the packages 352, 354 that cross processes boundaries are made under the package identity, such as a call 362 from the server application component 357 in the HR package 352 to a server application component 364 in the payroll package 354 or calls 366–367 from server application components 358, 364 to a database 370. The database 370 used by the server application therefore will be configured to allow access from the security application components in the packages without further client authorization checks.

On the other hand, the initial calls from client processes into the packages are subject to authorization checks. For example, a call 372 from a client application process 374 to an interface 378 of the server application component 356 in the HR package 352 is subject to an authorization check under the client process' identity (i.e., "joe") against role access privileges at each of the HR package 352, the server application component 356, and the interface 378 levels. Likewise, a call 382 from another client application process 384 is subject to the same authorization checks under that process' identity (i.e., "jane"). If the user id ("joe") of the client application process 374 is mapped to the roles that have access privileges at each of these levels then the call 372 succeeds. On the other hand, if the user id of the process 384 lacks the role-based access privileges at any of the package, component or interface levels, then the call 382 fails.

In the illustrated execution environment 82 (FIG. 2), the transaction server executive 80 performs the authorization checks for a call that crosses a process (package) boundary. The transaction server executive 80 is able to perform authorization checks because all calls to components in the ASP 90 are made using a safe reference, and therefore pass through the transaction server executive. If security is disabled on the package or the corresponding component, declarative authorization isn't checked. The transaction server executive 80 performs the authorization checks for a call that crosses the ASP/package boundary by applying the following methodology (represented in pseudo-code statements):

```
If roles are configured on the component interface Then
    If caller is in the set of roles on the component interface
        Return call authorization succeeds
    End if
End if
If roles are configured on the component Then
    If caller is in the set of roles on the component
        Return call authorization succeeds
    End if
End if
Return call authorization fails
```

With the illustrated method, the more privileged users are configured at the component level, and less privileged users specified at the component interface level. As an example, the server application component 356 in the HR package 352 might define the following interfaces:

```
coclass HRData
{
    IReadInformation
    IWriteInformation
}
```

A simple security configuration would be to configure two package roles, Clerk and Manager. The Clerk role has the right to read data, but not write data. The Manager has full rights to the object. In this scenario, the Clerk role would be applied to the IReadInformation component interface, and the Manager role would be applied to the HRData component.

Programmatic Access Control

The server application developer also can programmatically control access to processing services in the server application based on declared roles. The illustrated execution environment 80 (FIG. 2) provides a set of component integration interfaces with which the server application component 86 can access security information. Programmatic access control refers to the ability of the developer to programmatically define security for the server application by programming in the server application. The illustrated execution environment provides a basic and advanced interfaces for programmatic access control.

Basic Programmatic Security Interfaces

In the illustrated execution environment 82 (FIG. 2), the IObjectContext interface 139 provides two member functions for basic programmatic security, the IsCallerInRole and the IsSecurityEnabled functions. The IsCallerInRole function determines if the identity of the server application component's caller (e.g., base client process or another ASP, as when the HR package 352 calls the payroll package 354 in the example 350 of FIG. 18) is assigned to a specified role. The caller identity for the IsCallerInRole function is that of the process that called into the package (e.g., "joe" or "jane" for the calls 372, 382, respectively, of FIG. 18), regardless of whether further calls within the package have been made (e.g., calls 360–361 in FIG. 18). The IsSecurityEnable function verifies whether authorization checks are currently enabled for the package.

The developer can use the IsCallerInRole function to place further programmatic restrictions on security. For example, in an on-line banking server application having an account component that provides processing services for deposits and withdrawals, the developer can declaratively define access privileges to the component to allow users in both a tellers and a managers role to access the component so as to process deposits and withdrawals. The developer also can programmatically have the account component verify that a user is in the managers role when processing a deposit of over $50,000 through use of the IsCallerInRole function.

Advanced Programmatic Security Interfaces

The illustrated execution environment 82 (FIG. 2) further provides an interface, ISecurityProperty, supported on the component context object 136 that server application components can use to obtain security-related information from the component context object, including the identity of the client that created the object, as well as the identity of the current calling client. Server applications can use this information to implement custom access control (for example, using the Win32 security interfaces). Member functions of the ISecurityProperty interface allow the server application component to obtain more exact information on the caller, and the developer to programmatically define security based on that information. The functions use a Windows NT security identifier (SID), which is a unique value that identifies a user or group. Thus, with the ISecurityProperty interface, the server application component determines an exact identity of a user, but lacks the flexibility of development/deployment separation provided by roles.

Figure 19:
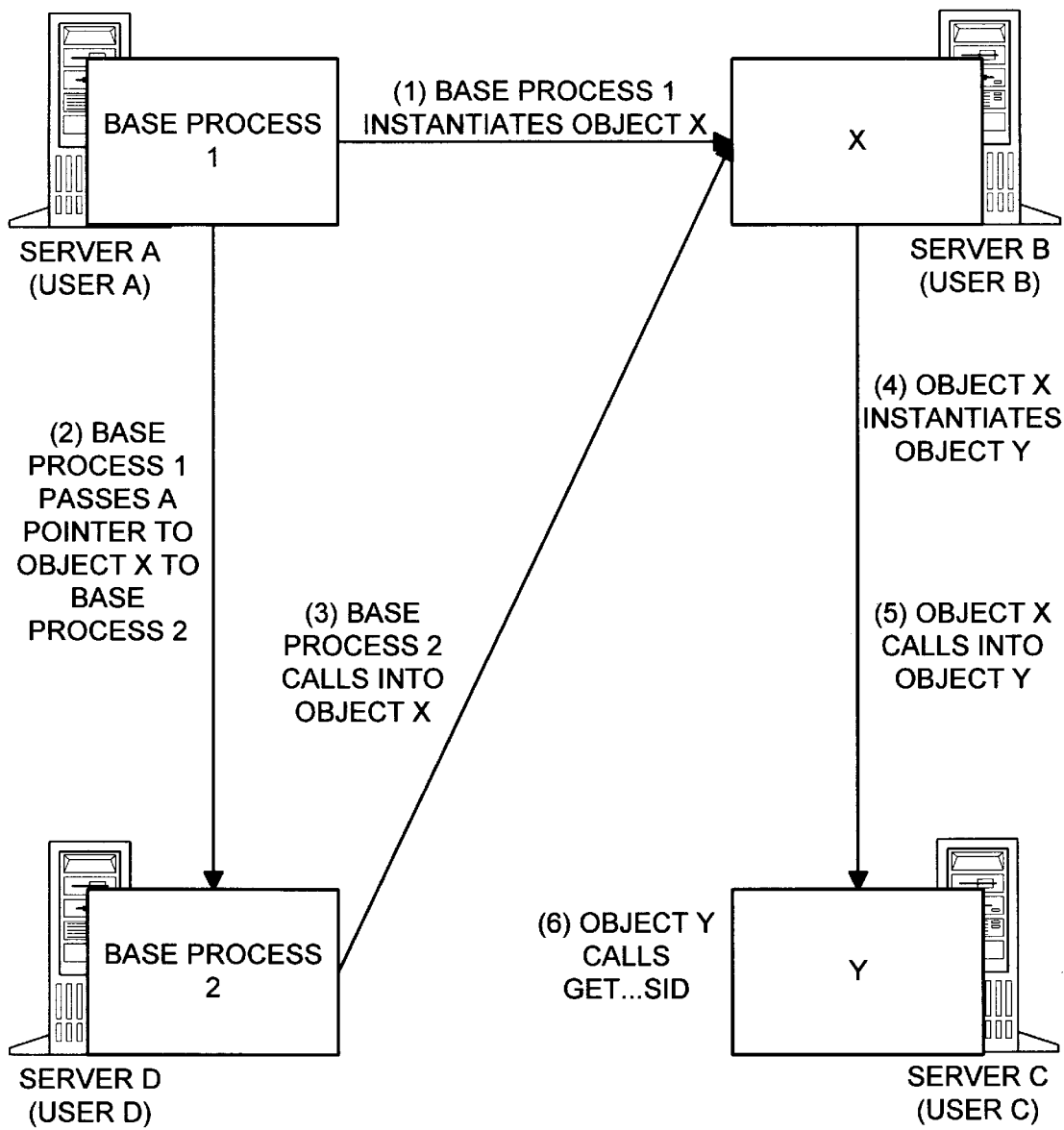
FIG. 19 is a block diagram illustrating a sequence of calls in an example server application to show operation of an advanced programmatic security interface.

FIG. 19 shows the SIDs that are returned by the various member functions of the ISecurityProperty interface after a certain sequence of calls. Calls to the following ISecurityProperty member functions made after the illustrated call sequence returns SIDs as follows. GetDirectCallerSID returns the SID associated with User B. GetDirectCreatorSID returns the SID associated with User B. GetOriginalCallerSID returns the SID associated with User D. GetOriginalCreatorSID returns the SID associated with User A.

Interfaces And API Functions For Role Based Security

With reference again to FIG. 2, the IObjectContext interface 139 is an interface of the system provided component context object 136. The IObjectContext interface 139 is used by the server application component 86 to create additional server application components, to participate in the determination of transaction outcomes, and for programmatic access control. The illustrated IObjectContext interface 139 has the following form (in the C programming language):

```
DECLARE_INTERFACE_(IObjectContext, IUnknown)
{
    //IUnknown functions
    HRESULT QueryInterface(THIS_REFIID riid, LPVOID FAR*
        ppvObj);
    ULONG AddRef(THIS);
    ULONG Release(THIS);
//IObjectContext functions
HRESULT CreateInstance(THIS_REFCLSID rclsid, REFIID
    riid, LPVOID FAR* ppvObj);
    HRESULT SetComplete(THIS);
    HRESULT SetAbort(THIS);
    HRESULT EnableCommit(THIS);
    HRESULT DisableCommit(THIS);
    BOOL IsIn Transaction(THIS);
```

-continued

```
    HRESULT IsCallerInRole (BSTR bstrRole, BOOL* pfIsInRole);
    BOOL IsSecurityEnabled ();
};
```

The server application component 86 calls the IsCallerInRole function to determine whether the component's direct caller is in a specified role (either individually or as part of a group). The server application component specifies the role of interest by name in the bstrRole parameter. The pfIsInRole parameter is an out parameter that returns TRUE if the caller is in the specified role, and otherwise returns FALSE. The IsCallerInRole function also sets the pfIsInRole parameter to TRUE if security is not enabled. Because the IsCallerInRole function returns TRUE when the server application component that invokes it is executing in a client's process, the server application component preferably calls IsSecurityEnabled before calling IsCallerInRole. If security isn't enabled, the IsCallerInRole function won't return an accurate result. The IsCallerInRole function returns a value as shown in the following table.

TABLE 1

IObjectContext::IsCallerInRole Return Values

| Value | Description |
|---|---|
| S_OK | The role specified in the bstrRole parameter is a recognized role, and the Boolean result returned in the pfIsInRole parameter indicates whether or not the caller is in the role. |
| CONTEXT_E_ | The role specified in the bstrRole parameter does not exist. |
| E_INVALIDARG | One or more of the arguments passed in is invalid. |
| E_UNEXPECTED | An unexpected error occurred. This can happen if one object passes its IObjectContest pointer to another object and the other object calls IsCallerInRole using this pointer. An IObjectContext pointer is not valid outside the context of the object that originally obtained it. |

The server application component 86 calls the IsSecurityEnabled function to determine whether or not security is enabled. The IsSecurityEnabled function returns TRUE if security is enabled for the server application component that invokes the function, and FALSE if not.

The transaction server executive 80 provides the SafeRef API function for use by the server application component to obtain a safer reference to itself that can be passed to another program. The SafeRef API function of the illustrated transaction server executive 80 has the following form (in the C programming language):

void* SafeRef (REFIID riid, UNKNOWN* punk);

When the server application component is to pass a self-reference to the client program 134 or another server application component, the server application component 86 calls the SafeRef function first and passes the safe reference returned from the function. This is to ensure that all calls to the server application component are made through the transaction server executive. Otherwise, if the server application component passes a direct self reference, the reference would become invalid when the server application component is subsequently deactivated. The server application component specifies the interface that is to be passed to another program by its interface ID with the riid parameter. The pUnk parameter is a reference to an interface on the current instance of the server application component. The SafeRef API function returns a value as shown in the following table.

TABLE 2

| Value | SafeRef Return Values<br>Description |
|---|---|
| Non-Null | A safe reference to the interface specified in the riid parameter. |
| NULL | The server application component requested a safe reference on an object other than itself, or the interface specified by the riid parameter is not implemented by the server application component. |

The transaction server executive 80 also provides a GetObjectContext API function that the server application component 86 can use to obtain a reference to the IObjectContext interface on its component context object 136, which the server application component can then use to create another server application component that inherits its context (including the transaction property object). The GetObjectContext API function of the illustrated transaction server executive has the following form (in the C programming language).

HRESULT GetObjectContext (IObjectContext**
           ppInstanceContext);

The ppInstanceContext parameter is a storage location of the server application component where the GetObjectContext API function is to return the IObjectContext interface pointer. The GetObjectContext API function returns a value as shown in the following table.

TABLE 3

GetObjectContext Return Values

| Value | Description |
|---|---|
| S_OK | A reference to the IObjectContext interface of the server application component's component context object is returned in the ppInstanceContext parameter. |
| E_INVALIDARG | The argument passed in the ppInstanceContext parameter is invalid. |
| E_UNEXPECTED | An unexpected error occurred. |
| CONTEXT_E_NOCONTEXT | The server application component doesn't have a component context object, such as because the component was not created under the transaction server executive's control. |

The ISecurityProperty interface also is an interface of the system-provided component context object 136. The ISecurityProperty interface is used to ascertain the security ID of the current object's caller or creator. The server application component obtains an interface pointer to the ISecurityProperty interface by calling QueryInterface on the component's component context object (e.g., with the statement, "m_pIObjectContext→QueryInterface (IID_ ISecurityProperty, (void**)&m_ pISecurityProperty));").

The ISecurityProperty interface provides the member functions shown in the following table.

TABLE 3

ISecurityProperty member functions

| Function | Description |
|---|---|
| GetDirectCallerSID | Retrieves the security ID of the external process that called the currently executing method. |
| GetDirectCallerSID | Retrieves the security ID of the external process that called the currently executing method. |
| GetDirectCreatorSID | Retrieves the security ID of the external process that directly created the current object. |
| GetOriginalCallerSID | Retrieves the security ID of the base process that initiated the call sequence from which the current method was called. |
| GetOriginalCreatorSID | Retrieves the security ID of the base process that initiated the activity in which the current object is executing. |
| ReleaseSID | Releases the security ID returned by one of the other ISecurityProperty methods. |

The ISecurityProperty member functions have the following form (shown in the C programming language):

```
HRESULT ISecurityProperty::GetDirectCallerSID (
    PSID* ppSid
);
HRESULT ISecurityProperty::GetDirectCreatorSID (
    PSID* ppSid
);
HRESULT ISecurityProperty::GetOriginalCallerSID (
    PSID* ppSid
);
HRESULT ISecurityProperty::GetOriginalCreatorSID (
    PSID* ppSid
);
HRESULT ISecurityProperty::ReleaseSID (
    PSID pSID
);
```

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a software application development system, a method of defining user access rights to objects of a component-based application prior to distribution and deployment to a plurality of end-user computer systems having a security facility requiring a user to log-on under one of a plurality of user identities configured on the respective computer system, and having a role-based access control operating in response to roles and access privileges declared for the component-based application and a configuration associating the user identities of the respective computer system to the declared roles to control access of a current user to component-based application objects depending on the user identity of the current user being associated in a declared role having declared access privileges for the object, the method comprising:

declaratively creating a roles data structure containing information defining a plurality of roles applicable to the component-based application;

declaratively creating a role privileges data structure containing information defining access privileges of the roles to the objects; and packaging the roles data structure and the role privileges data structure with the component-based application into a distribution unit;

whereby on deployment of the distribution unit to a respective one of the end-user computer systems, the role-based access control of such respective end-user computer system operates to control access of such respective end-user computer system's users to the objects based on the roles and access privileges defined in the distribution unit.

2. The method of claim 1 wherein declaratively creating the role privileges data structure comprises specifying access privileges of roles to interfaces of the objects.

3. A computer-readable storage medium having stored thereon computer-executable program code operative to perform the method of claim 1.

4. A computer-readable data storage media having a distribution unit for a distributable component-based software application stored thereon, the software application being installable for execution on a computer system having, a role-based access control operating to control access by a user operating the computer system under a user identity to objects depending on the user's user id entity being associated in a role having access privileges for the objects, the distribution unit of the software application comprising:

executable code to implement a set of objects of the software application having interfaces providing a set of operations accessible to a client program;

a roles data structure containing information defining a set of roles applicable to the software application; and an access privileges data structure containing information defining access privileges of the roles to objects in the software application;

whereby access control is declaratively defined for the software application prior to distribution and deployment of the software application to the computer system.

5. The computer-readable data storage media of claim 4 wherein the access privileges data structure contains information defining access privileges of the roles to interfaces of the objects.

6. In a computer configured for operation by users having user identities, an object execution system software program for controlling access by a user of the computer to objects in a component-based software application based on a set of abstract user classes defined for the software application at development thereof, the component-based software application being distributed to the computer in a deployment unit containing a roles data structure defining the set of abstract user classes and an access privileges data structure defining access privileges of the abstract user classes to the objects, the object execution system software program comprising:

a security configuration data store containing data associating user identities to the abstract user classes; and an authorization checker operating to check upon access by a caller program operating under a user identity to a called object in the component-based software application whether the user identity is associated with an abstract user class having an access privilege to call into the called object, and to permit or deny the access depending on a result of the check;

whereby the object execution system software program permits access control for the component-based software application to be declaratively defined at development as an abstraction independent of the user identities actually configured on the computers on which the software application is later deployed.

7. The object execution system software program of claim 6 further comprising:

a security configuration utility operating in response to declaration of a binding of a user identity to an abstract user class to store an association of the user identity to the abstract user class in the security configuration data store.

8. A method of access control within a computer based on abstract user classes declaratively defined at development of a software application having code to implement a set of objects, the method comprising:

in response to declaration by a developer of a set of roles representing abstract classes of users not as yet fixed to any particular configuration of actual user identities on computers to which the software application is to be deployed, generating a roles data structure containing data to represent the role classes;

in response to declaration by the developer of access privileges of the role classes to the objects, generating an access privileges data structure containing data to represent the access privileges;

packaging the roles data structure and the access privileges data structure into a deployment unit containing the software application;

deploying the deployment unit to a computer;

in response to declaration by an administrator of the computer of bindings from user identities configured on the computer to the role classes, storing data in a configuration store to represent the bindings;

upon a request of a client program code operating under a user identity on the computer to access an object of the software application, determining to permit or deny the access depending upon a result of an authorization check whether the user identity is bound to a role having an access privilege to the object.

9. A computer-readable storage medium having stored thereon computer-executable program code operative to perform the method of claim 8.

10. In a computer configured for operation by users having user identities, an object execution system software module for controlling access to objects of a software application distributed to the computer in a deployment unit containing a roles data structure declaratively defining roles representative of a set of abstract user classes and an access privileges data structure declaratively defining access privileges of the roles to the objects, the object execution system software module comprising:

a configuration data store containing data defining bindings of the user identities to the roles; and code to implement a programmatic access control function for calling from the software application, the programmatic access control function having a role parameter designating a role out of the roles set, the programmatic access control function operating in response to the software application's call to return a value indicating whether a user identity under which the software application was accessed is bound to the parameter-designated role.

11. A method of programmatically controlling access within a component-based software application based on a set of abstract user classes declaratively defined at development independent of the user identities actually configured on the computers to which the component-based software application is to be later deployed, the component-based software application being executable on a computer having an object execution system that implements a programmatic access control function operative to return a value indicative of whether a user identity of a calling thread is bound to a parameter-specified abstract user class of the component-based software application, the method comprising:

in response to declaration by a developer of a set of roles representing abstract classes of users not as yet fixed to any particular configuration of actual user identities on computers to which the component-based software application is to be deployed, generating a roles data structure containing data to represent the roles;

within program code of an object of the component-based software application, issuing a call to the programmatic access control function in which a particular role is specified by a function parameter and also conditioning a processing operation of the object on a result of the programmatic access control function call; and packaging the roles data structure and the access privileges data structure into a deployment unit containing the software application.

12. A computer-readable storage medium having stored thereon computer-executable program code operative to perform the method of claim 11.

* * * * *

UNITED STATES PATENT AND TRADEMARK OFFICE
CERTIFICATE OF CORRECTION

PATENT NO.   : 6,014,666

DATED        : January 11, 2000

INVENTOR(S)  : Patrick J. Helland et al.

It is certified that errors appear in the above-identified patent and that said Letters Patent is hereby corrected as shown below:

| Col./Line | | Should Read |
|---|---|---|
| 26/34 | id entity | identity |

Signed and Sealed this

Tenth Day of April, 2001

Attest:

NICHOLAS P. GODICI

Attesting Officer    Acting Director of the United States Patent and Trademark Office